United States Patent
Iles-Klumpner (10) Patent No.: US 7,230,359 B2
(45) Date of Patent: Jun. 12, 2007

(54) ELECTRIC MOTOR WITH POLES SHAPED TO MINIMIZE COGGING TORQUE

(75) Inventor: Dorin Iles-Klumpner, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/981,170

(22) Filed: Nov. 3, 2004

(65) Prior Publication Data

US 2005/0062354 A1    Mar. 24, 2005

Related U.S. Application Data (63) Continuation-in-part of application No. 10/390,824, filed on Mar. 18, 2003, now Pat. No. 6,919,663.

(30) Foreign Application Priority Data

Mar. 22, 2002  (DE) ................... 202 04 660 U
Nov. 5, 2003   (DE) ................... 203 17 021 U
Sep. 1, 2004   (EP) ................... 04020696

(51) Int. Cl.
*H02K 21/12* (2006.01)
(52) U.S. Cl. .............. 310/156.53; 310/156.56
(58) Field of Classification Search .......... 310/156.53, 310/156.01, 156.38, 156.32, 156.56, 156.48, 310/156.54, 269

See application file for complete search history.

(56) References Cited

U.S. PATENT DOCUMENTS 4,486,679 A    12/1984    Jones .................. 310/218

(Continued)

FOREIGN PATENT DOCUMENTS

EP    1 164 684 A2    12/2001

(Continued)

OTHER PUBLICATIONS

Patent Abstracts of Japan, English abs. of JP-2000-027 896-A, OKI+/ Nissan Motor Co., LTD.

(Continued)

*Primary Examiner*—Darren Schuberg
*Assistant Examiner*—David W. Scheuermann
(74) *Attorney, Agent, or Firm*—Milton Oliver, Esq.; Ware Fressola Van Der Sluys & Adolphson LLP

(57) ABSTRACT

An electric motor has a rotor (36) and a stator (28) having a lamination stack formed with slots (126). The slots have a predetermined slot pitch ($\tau s$), and a multi-phase stator winding is arranged in them. The rotor (36) has salient poles having pole shoes (136) and a magnetic return path (130). Between the return path (130) and each pole shoe (136), a recess (138, 140) is formed for receiving a permanent magnet (38). On each side of such a permanent magnet (38), a region (146a, 146b) of poor magnetic conductivity is arranged, in order to make the flux distribution in the air gap more sinusoidal. Measuring in a circumferential direction, the width ($\beta$) of a pole shoe (136) decreases with increasing distance from an interface (138) between said return path and said permanent magnet (38), and, at a place of lowest width, the pole shoe has an angular extent ($\beta c$) which has, with respect to the slot pitch ($\tau s$) between said stator slots (126), the following relationship:

$$\beta c = n^* \tau s^*(1-0.02) \ldots n^* \tau s^*(1-0.2),$$

where n=1, 2, 3 . . . and
$\beta c$ and $\tau s$ are measured in mechanical degrees.

10 Claims, 5 Drawing Sheets

U.S. PATENT DOCUMENTS

| | | | |
|---|---|---|---|
| 4,570,333 A | 2/1986 | Jones | 29/598 |
| 6,008,559 A * | 12/1999 | Asano et al. | 310/156.53 |
| 6,218,753 B1 * | 4/2001 | Asano et al. | 310/156.53 |
| 6,234,767 B1 | 5/2001 | Takeda et al. | 417/355 |
| 6,353,275 B1 | 3/2002 | Nishiyama et al. | 310/156.53 |
| 6,486,581 B2 * | 11/2002 | Miyashita et al. | 310/156.53 |
| 6,525,442 B2 | 2/2003 | Koharagi et al. | 310/156.48 |
| 6,597,079 B2 * | 7/2003 | Miyashita et al. | 310/156.48 |
| 6,858,961 B2 | 2/2005 | Tagome et al. | 310/156.56 |
| 7,042,127 B2 * | 5/2006 | Tsuruta et al. | 310/156.53 |
| 2002/0067096 A1 | 6/2002 | Yamamoto et al. | 310/216 |
| 2002/0171309 A1 | 11/2002 | Wakui | |
| 2003/0178905 A1 | 9/2003 | Koharagi et al. | |
| 2004/0256940 A1 | 12/2004 | Tsurata et al. | 310/156.53 |
| 2005/0168089 A1 | 8/2005 | Miyashita et al. | 310/156.57 |

FOREIGN PATENT DOCUMENTS

| | | |
|---|---|---|
| EP | 1289101 A3 | 3/2003 |
| JP | 05-236 684 | 9/1993 |
| JP | 05-236 686 | 9/1993 |
| JP | 2000-069 717 | 3/2000 |
| JP | 2000-278 896 A | 10/2000 |
| JP | 2000-350 393 | 12/2000 |
| JP | 2005-224 089 A | 8/2005 |
| WO | 03/081748 A | 10/2003 |

OTHER PUBLICATIONS

Patent Abstracts of Japan, English abs. of JP-2002-281 700-A, Mashita/Fuji Electric Co., LTD.

Patent Abstracts of Japan, English abs. of JP-2000-0278 896-A, OKI+/Nissan Motor Co., LTD. publ. Oct. 6, 2000 (one page).

Patent Abstracts of Japan, English abs. of JP-2005-224 089-A, Miyashita & Onodera/Sanyo Denki, publ. Aug. 18, 2005 (2 pp.).

* cited by examiner

ELECTRIC MOTOR WITH POLES SHAPED TO MINIMIZE COGGING TORQUE

CROSS-REFERENCE TO RELATED APPLICATIONS

This application is a continuation-in-part of my U.S. Ser. No. 10/390,824, filed 18 Mar. 2003 now U.S. Pat. No. 6,919,663. This application claims priority of German application DE 203 17 021.0, filed 5 Nov. 2003 and of European application 04 020 696.3, filed 1 Sep. 2004. The parent US application claims priority of German application DE 202 04 660.5, filed 22 Mar. 2002. The contents of all of these priority applications are hereby incorporated by reference.

FIELD OF THE INVENTION

The present invention relates to an electric motor, which preferably is configured as an internal rotor motor.

BACKGROUND

Such motors, preferably employing electronic commutation, are used, because of their low axial moment of inertia, for jobs where an electric motor's RPM must very quickly respond to electrical commands, e.g. for fast positioning of parts, or servo-assistance to movements. For this purpose, one desires such a motor to have a very uniform torque. One generally achieves this by a three-phase configuration of the motor, in which each of the phases has an essentially sinusoidal current applied to it, and the motor is so designed that, in the phases or strands of the multi-phase stator winding, sinusoidal voltages are induced. One also calls such a motor a "sine motor."

In such motors, the phenomenon occurs that the boundaries between the individual rotor poles, the so-called "pole boundaries," seek the positions of the largest air gaps. For the observer, this has the appearance as if the pole boundaries were attracted by the slots of the stator. This effect is called "cogging." The torque created thereby is called "cogging torque" because it seeks to hold the rotor in particular rotational positions.

This effect is generated by a so-called "reluctance torque," i.e. during the rotation of the rotor, relative to the stator, magnetic energy is stored in the magnetic circuit of the motor in certain rotation angle ranges, and, in other rotation angle ranges, this magnetic energy is released, analogous to when one alternately tensions a spring and releases it. For the storing, energy must be supplied to the rotor, i.e. the rotor is being braked thereby, and conversely, where the stored energy is being released, the rotor is being driven. If one turns the rotor of such a motor by hand, one has the impression that one "feels every slot."

In the context of many drive applications, this reluctance torque is disruptive, so that there one is forced to use so-called "ironless" stator windings in which no reluctance torque arises. However, the power of such motors with ironless stators is generally insufficient because their air gap is very large. This leads to a high "specific weight" (weight/power ratio), i.e. the relationship of motor power to motor volume or motor power to motor weight is unfavorable with them.

Some have tried to overcome this problem by giving the pole shoes of the rotor a particular form, but that has led, thus far, to a structure in which the specific weight was unfavorable.

SUMMARY OF THE INVENTION

It is therefore an object of the invention to provide a sufficiently powerful internal rotor motor with minimized cogging torque. According to the invention, this object is achieved by careful shaping of cavities, formed in the rotor adjacent each circumferential end of the permanent magnets, and extending into undersides of the pole shoes, thereby giving each pole shoe a kind of mortarboard shape. One thereby obtains a multi-phase electric motor, in whose rotor one can use magnets whose angular span is not much smaller than a pole pitch of the rotor, and which nevertheless results in an induced voltage having a good sinusoidal form and an acceptable cogging torque. This makes it possible to improve the specific weight of such motors, i.e., for the same power, it suffices to use a motor which is smaller and lighter than before.

Further details and advantageous refinements of the invention are set forth in the following description and accompanying drawings, which are to be understood as preferred embodiments but not as any limitation of the invention.

DETAILED DESCRIPTION

Figure 1:
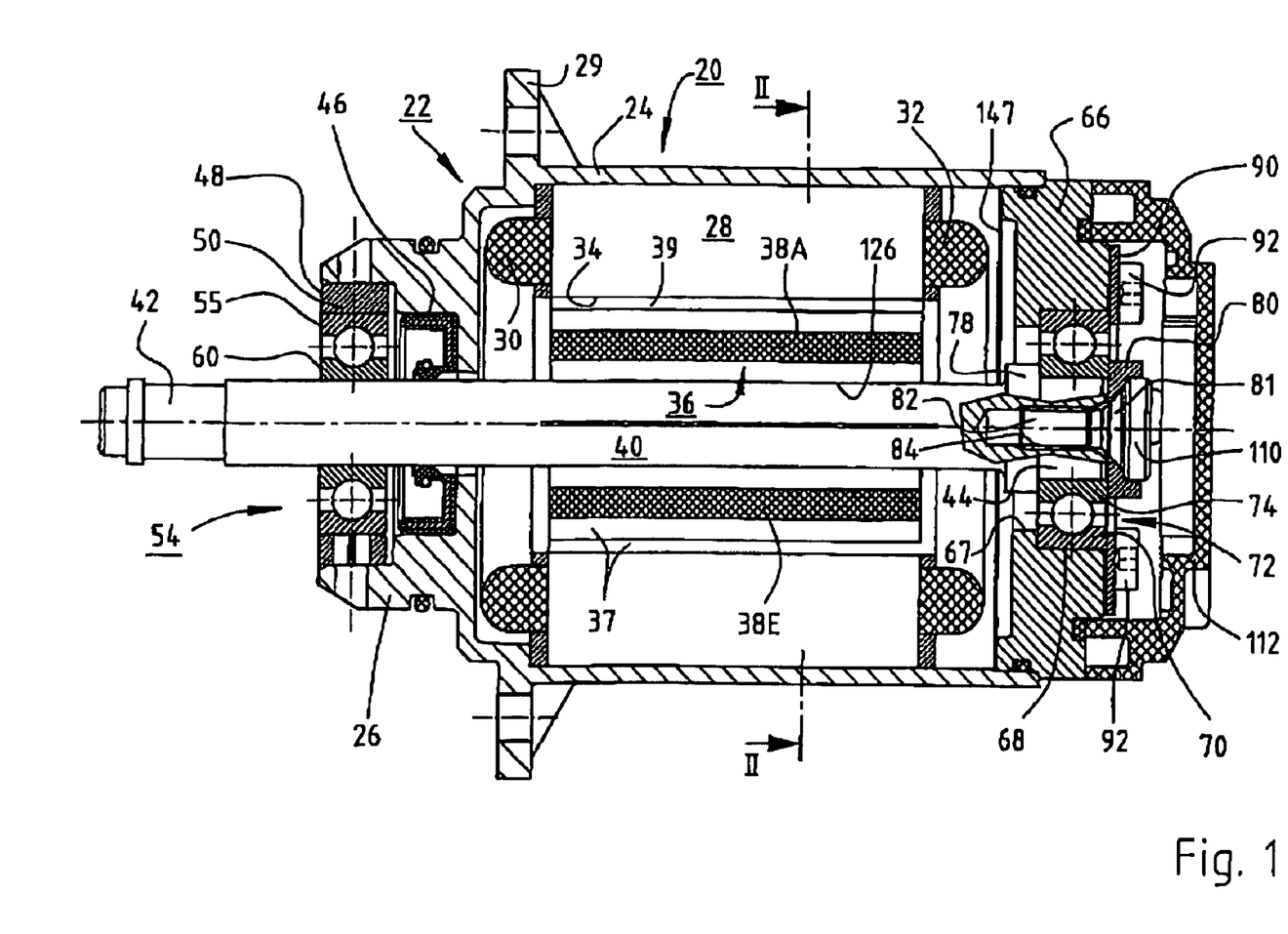
FIG. 1 is a longitudinal sectional view of a preferred embodiment of a motor according to the present invention.

FIG. 1 shows an electronically commutated internal rotor motor 20 with a housing 22 having a cylindrical housing portion 24, an A-side bell 26 and a securing flange 29.

In the cylindrical housing portion 24, there is arranged the lamination stack 27 (FIG. 2) of an external stator 28 whose coil ends are designated 30 and 32. Stator 28 has an internal recess 34 in which is arranged an eight-pole internal rotor 36 having a lamination stack 37 made of an alloy according to German Industrial Standard DIN 46400, sheet 1, preferably alloy V400. Preferably, eight permanent magnets 38A through 38H (see FIGS. 2–3) are arranged on a shaft 40, whose drive end is designated 42 and whose inside shaft end is designated 44. An air gap 39 separates stator 28 from rotor 36. Such a motor can be called a "permanently excited synchronous internal rotor machine" or a "three-phase motor with impressed sinusoidal currents."

In the A-side bell 26, in the usual manner, a seal 46 is provided for the shaft 40. Also there is a recess 48, into which is placed a guide element 50 for the outer race 55 of a ball bearing 54. The inner race 60 of ball bearing 54 is pressed onto shaft 40.

In the open end of cylindrical housing portion 24, a B-side bell 66 is secured. It has a recess 68 provided with an annular shoulder 67 for the outer race 70 of a ball bearing 72, whose inner race 74 is secured to shaft end 44. Shaft 40 has a collar 78, with which it rests against the left side of inner race 74. Against its right side rests a fitting 80 made of brass which is pressed by the countersunk head 31 of a countersunk screw 82 in the direction of shaft 40, and which has an essentially annular shape. Screw 82 engages in an internal thread 84 in shaft end 44, and thereby presses the fitting 80 in the direction of inner race 74.

For secure holding-in of outer race 70, there is provided a flat, annular part or washer 90, which is secured at its outer periphery to bell 66 using three evenly spaced screws 92. Part 90 rests, with its radial inner portion against outer race 70, which it presses leftwards against shoulder 67. The recess 68 is somewhat shallower than the outer race 70.

The screw 82 is a flathead screw with a hexagonal recess. After fitting 60 is secured, by means of screw 82, onto shaft end 44, a control magnet 110 is secured in a cylindrical recess of fitting 80, e.g. by gluing. Control magnet 110 is provided, on its right side as shown in FIG. 1, with a magnetization pattern, and serves for control of magnetoresistive resistors (not shown) which are arranged inside a housing cover 112 on the B-side of motor 20, and serve for detection of the rotational position of rotor 36, in order to exactly control the form and commutation of the currents in stator 28. Commutation by means of such rotor position sensors controlled by a control magnet 110 is known, in many variations, to those of ordinary skill in the art, and therefore requires no further explanation.

Figure 2:
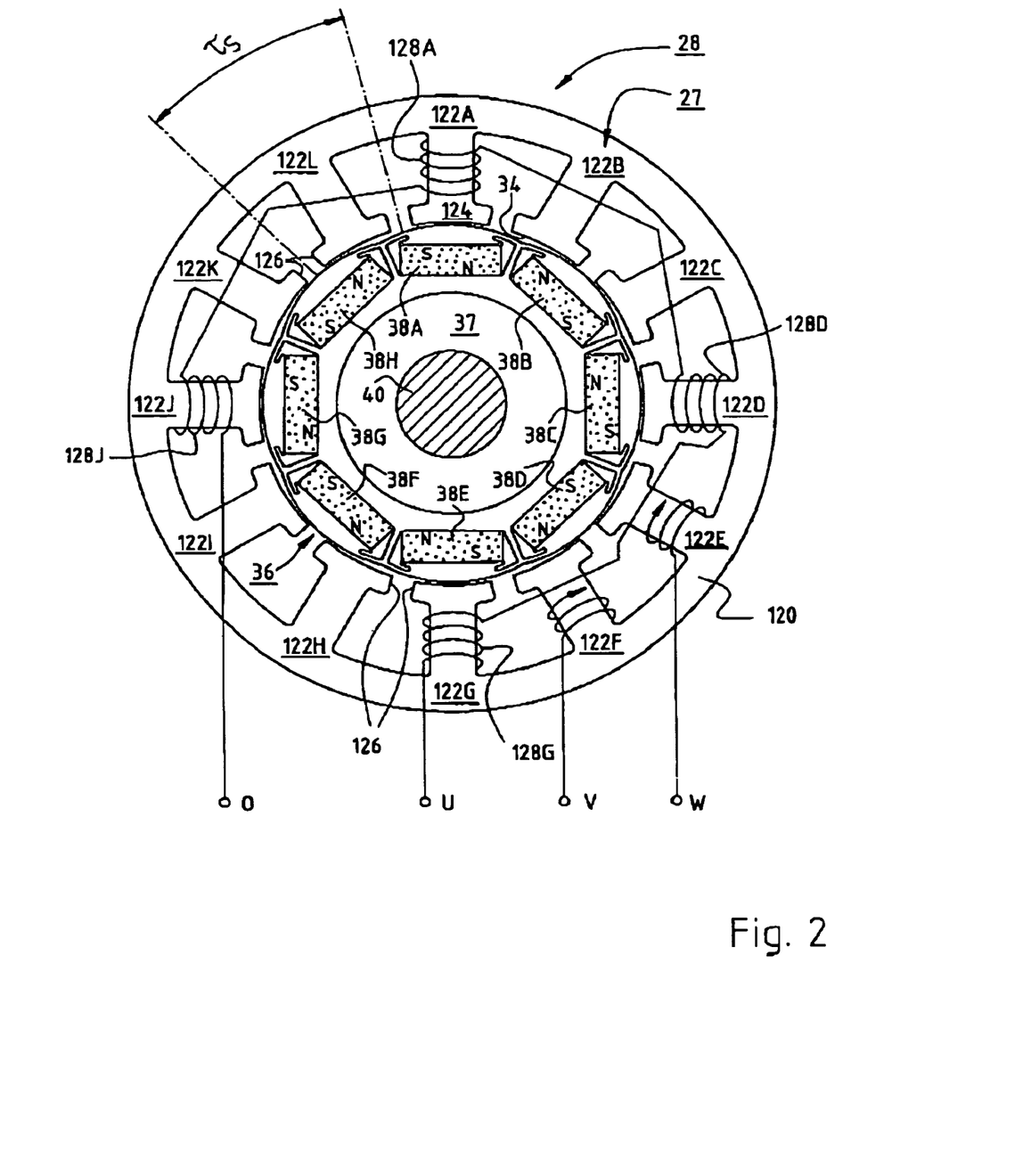
FIG. 2 is a section, looking along line II—II of FIG. 1, at a scale enlarged with respect to FIG. 1.

FIG. 2 is an enlarged section looking along line II—II of FIG. 1. As can be seen from FIG. 2, magnets 38A through 38H are arranged with alternating respective radial polarities. Magnet 38A has a south pole S outward, and a north pole N inward. Looking clockwise around the rotor, the next magnet 38B has a north pole N outward and a south pole S inward, etc., as shown in the drawing.

Stator lamination stack 37 has outward an armature 120, from which twelve teeth 122A through 122L project radially inward, and which are formed, in the manner shown, with widened heads 124, defining between them slots 126. The slot pitch between two adjacent slots 126 is designated τs and amounts here to:

$$\tau s = 36/12 = 30° \text{ mech.} \quad (1)$$

It was found, surprisingly, that the form of the rotor poles should have a specified relationship to τs. This is further explained below, with reference to FIGS. 3–4 and equations (4) and (5).

Teeth 122 are wound with concentrated or "lumped" windings. Phase U is illustrated, as an example. This phase begins with a concentrated winding 128G on tooth 122G, continues in a concentrated winding 128G on tooth 122G, continues in a concentrated winding 126D on tooth 122D, further in a winding 128A on tooth 122A, and a winding 128J on tooth 122J. From there, phase U goes back to neutral point 0, assuming that a winding in a star or Y configuration is used. Naturally, a Δ configuration is also possible.

The partial windings 126G, 128D, 128A and 128J can also be connected in parallel, e.g. in case motor 20 is driven from a DC source with a low voltage such as in a car, since then one obtains winding phases having a low inductance and a low ohmic resistance.

Winding phases V and W are only shown schematically in FIG. 2, since it is clear to those skilled in the art, that they have the same topology, but are displaced, in the counter-clockwise direction, by 22.5° mech. (phase V) or 45° mech. (phase W) with respect to phase U.

In the present invention, one tries to cause sinusoidal voltages to be induced in the individual phases U, V and W as rotor 36 turns. One thus also speaks of a "sine motor." In phases U, V, and W, sinusoidal currents are then impressed.

The structure of rotor 36 will now be explained with reference to FIG. 3 which is an enlargement of a detail of FIG. 2. Shaft 40 is not shown there, since it consists of a ferromagnetic material and forms a portion of the magnetic circuit in rotor 36.

Rotor 36 has, in its center, a magnetic core or armature 130 which is composed, in the usual manner, of a stack of stamped laminations. This stack is preferably constructed in the same manner as the one which is thoroughly shown and described in WO 03/081748-A1, FIGS. 2–8, filed 10 Jan. 2003, corresponding to my earlier U.S. patent application Ser. No. 10/390,824, filed 18 Mar. 2003. For the sake of brevity, the entire content of these applications is hereby incorporated by reference.

A plurality of pole pieces 136A, 136B, 136C, etc. are connected with core 130 via radially-oriented narrow connecting parts 132 and attached circumferentially-oriented connecting parts 134a, 134b. The axis of symmetry of pole shoe 136B is designated 137.

The pole shoes 136 each have, on their core-adjacent side, a respective interfacing surface 138A, 138B, 138C, hereinafter designated as "magnet/pole shoe boundary" and which is parallel to, and spaced by a distance D from, respective opposing surfaces 140A, 140B, 140C etc. Instead of a single magnet 38, one could assemble it from multiple parts, as is known to those skilled in the art.

Figure 4:
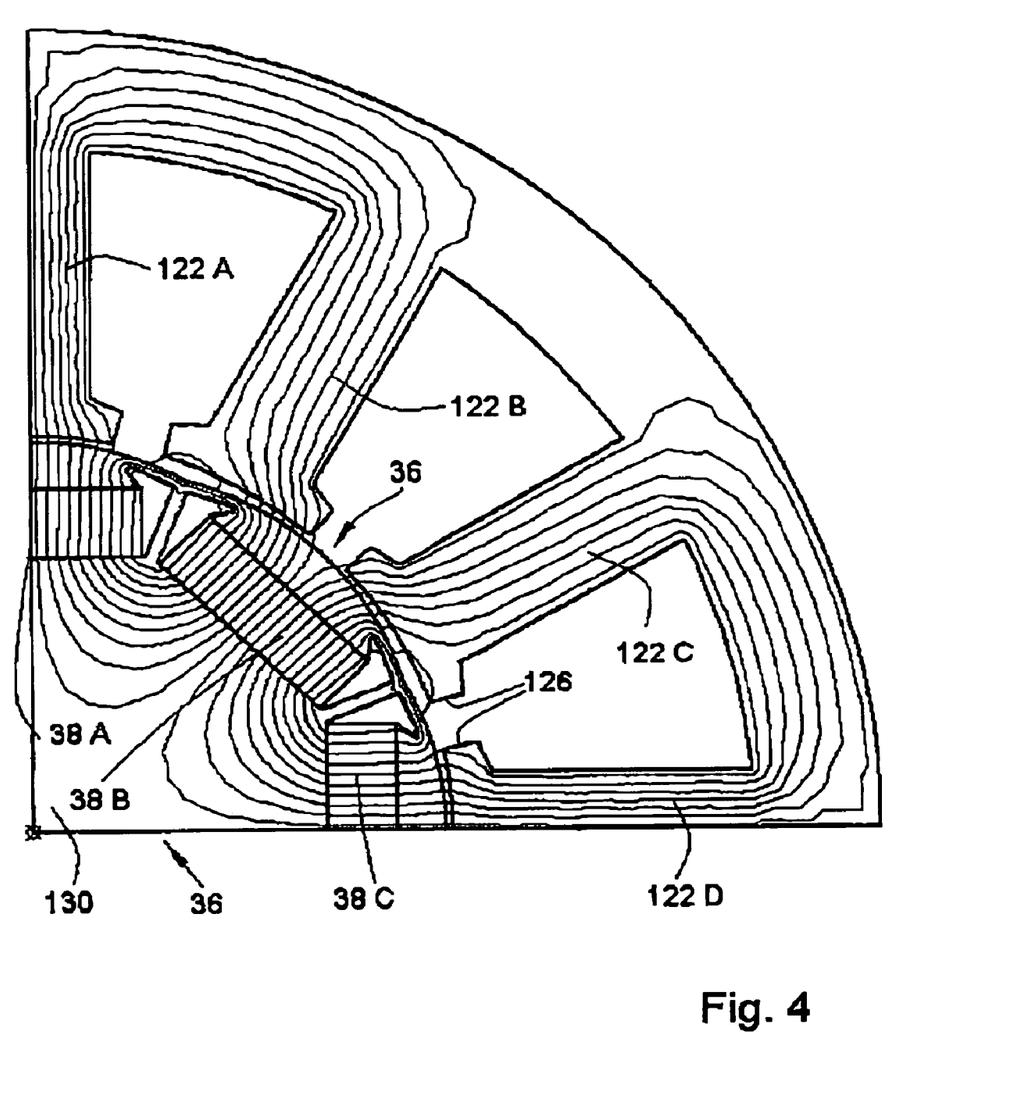
FIG. 4 is a view analogous to FIGS. 2 and 3, in which the pattern of magnetic flux lines, for a particular rotor position, is shown, in order to explain the generation of a sinusoidal induced voltage.

Between these interfacing surfaces 138, 140, the already-described permanent magnets 38A, 38B, 38C are inserted. They each have a rectangular cross-section and a magnetization which is illustrated in FIG. 4.

Figure 3:
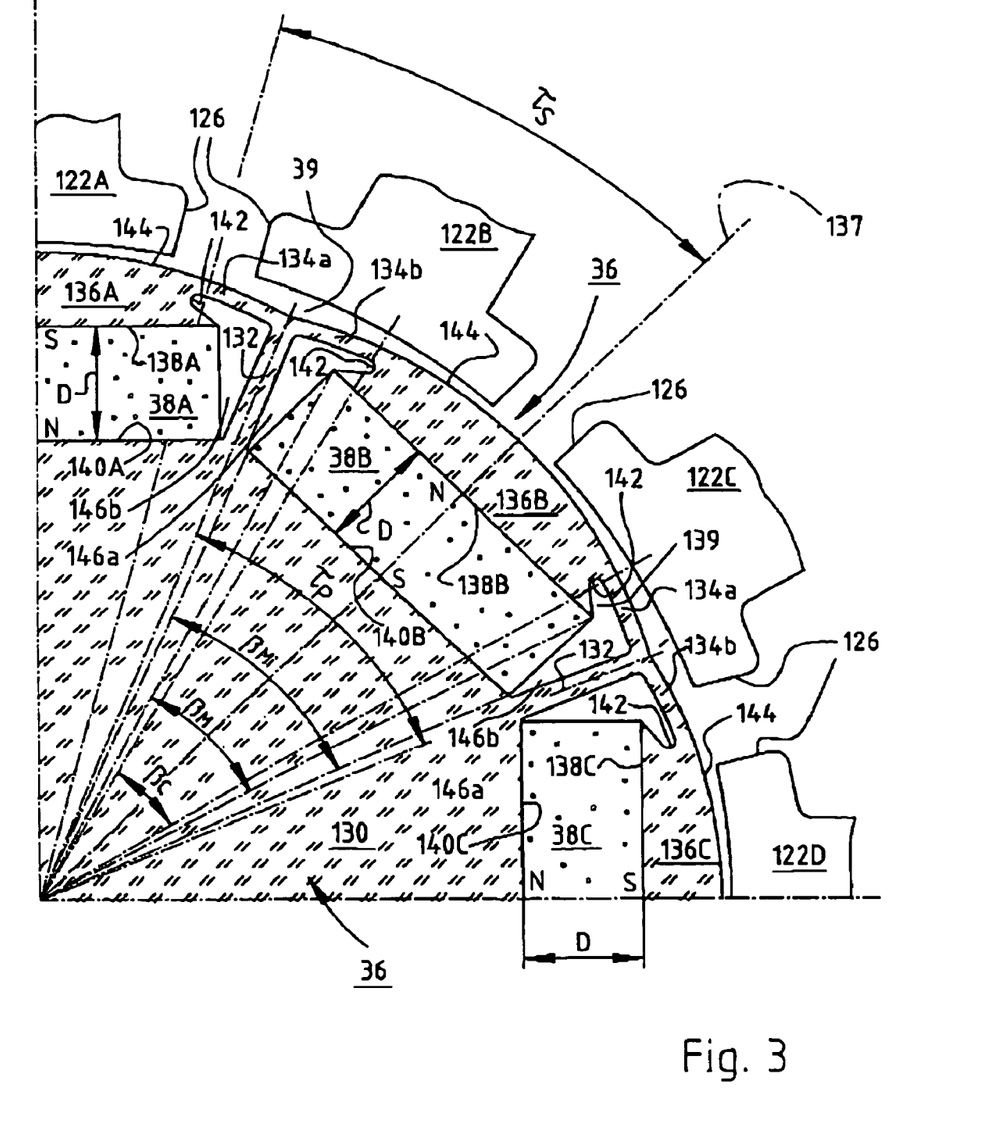
FIG. 3 shows a detail of part of FIG. 2, at a further enlarged scale.

As shown in FIG. 3, each magnet 38 has, at its magnet/pole shoe boundary, an angular extent βm, and this angular extent corresponds to that of the contiguous pole shoe 136. If one goes radially outward from this magnet/pole shoe boundary 138, the width β of pole shoe 136 tapers down within a substantially continuous transition zone 139 and reaches, at a point 142, its smallest width βc, which is smaller than βm, as shown in FIG. 3.

Radially outward of point 142, pole shoe 136 transitions sidewise into the peripherally extending connecting parts 134a, 134b. These parts, during operation, are magnetically saturated, so in the context of the present invention, they primarily have a mechanically supporting function. As one recognizes particularly well from FIG. 3, pole shoes 136 have, in conjunction with the holding parts 134, essentially the cross-sectional shape of an American mortarboard cap, and this represents a preferred form of these pole shoes.

As one further recognizes from FIG. 3, the radially outer side 144 of a pole shoe 136 is so configured that, in air gap 39, an approximately sinusoidal flux distribution arises, i.e. the diameter of outer side 144 diminishes, starting from the center of a rotor pole, in both sidewise directions, as shown.

On both sides of permanent magnet 39, referring to the circumferential direction, there is formed a respective cavity 146a, 146b, whose cross-sectional shape approximates a right triangle. The long diagonal side of the triangle has kind of a dogleg, because a radially outer corner of permanent magnet 38 juts somewhat into this cavity 146.

In FIG. 3, the pole pitch τp of rotor pole 136B is indicated. Since rotor 36 has eight poles 136, the corresponding pole pitch $$\tau p=360°/8=45° \text{ mech.} \quad (2)$$

As also indicated in FIG. 3, a permanent magnet 38 has, on its inner boundary surface 140, a magnetic width βBi of about 41° mech., i.e. about 91% of a pole width τp. Magnet 38 extends almost to connecting part 132, and the volume of magnets 38 is therefore large.

Normally, such a rotor topology would be undesirable and would lead to more of a rectangular flux distribution in air gap 39, and to a high cogging torque. However, by means of the constriction 142 of pole shoes 136 having the angle βc which is smaller than βm, one obtains a flux distribution which quite closely approaches the desired sinusoidal form.

Please refer to FIG. 4, which shows the distribution of flux lines.

As one sees, e.g. at magnet 38B, on its two sides, referring to the circumferential direction, a portion of the flux passes through cavities 146 (FIG. 3) adjacent the constrictions 142. These cavities act like a supplemental magnetic resistance and, since a cavity broadens circumferentially in a direction away from constriction 142, the magnetic resistance also increases as one moves circumferentially away from this point 142 (FIG. 3). One thereby obtains the substantially sinusoidal flux distribution shown in FIG. 4, i.e. the constrictions 142 cause, first, a concentration of the magnetic flux at the pole center and, secondly, act as magnetic resistances which permit, even adjacent the pole gaps of rotor poles 136, a small magnetic flux, as one desires for a sinusoidal flux distribution. By corresponding dimensioning of the cavities 146, one can "titrate" (incrementally adjust) the flux at the sides.

I have discovered that it is important, for the magnitude of the cogging torque, that the angle βc (FIG. 3) has, at most, the magnitude of the angle of a slot pitch τc and preferably is smaller than that. In the embodiment illustrated, $$\tau s=360°/12=30° \text{ mech.} \quad (3)$$

and the angle βc is about 27° mech., i.e. about 90% of τs. It has been found that, for βc in a concentrated winding, approximately the following relation should hold:

$$\beta c=\tau s*m \quad (4)$$

where m=0.8, . . . 1.0, and all angles are measured in mechanical degrees.

In case a distributed winding is used, the equation reads:

$$\beta c=\tau s*m*n \quad (5)$$

where m=0.8 . . . 1.0 and n=1, 2, 3, . . .

Preferably, m has a value between 0.8 and 0.98.

It has been found that, in this manner, particularly when using concentrated windings, a very good sinusoidal form of the induced voltage can be obtained, in conjunction with an acceptable cogging torque. The considerable magnetic width βMi of magnets 38 allows a corresponding size reduction for motor 20, compared with prior art versions. In one exemplary embodiment, there resulted a longitudinal size reduction in the motor from 68 mm down to 50 mm, with the same output power; in actual practice, differing values may be obtained.

Figure 5:
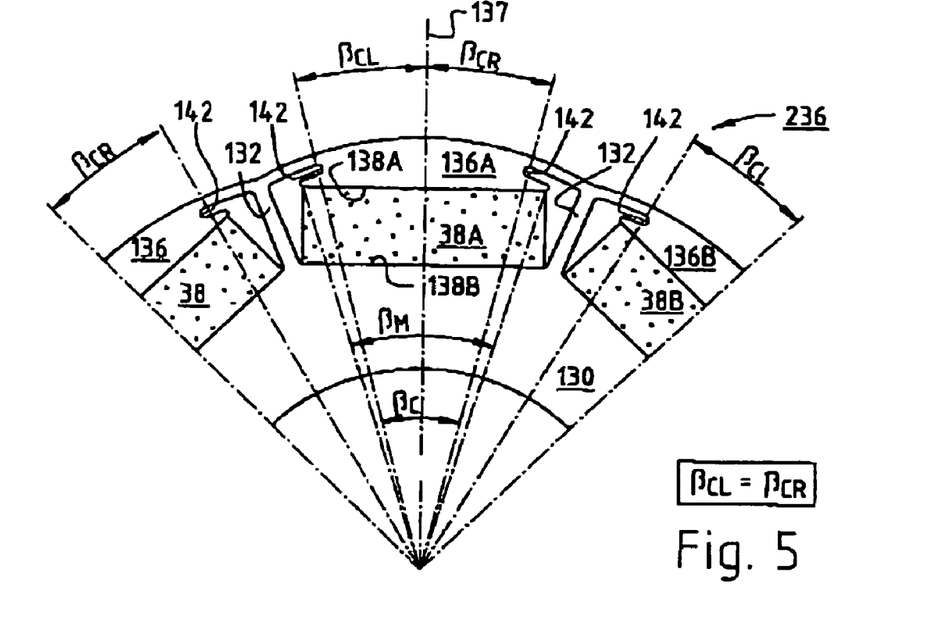
FIG. 5 is a view analogous to FIG. 3, namely the illustration of a section of a symmetrical rotor lamination.
Figure 6:
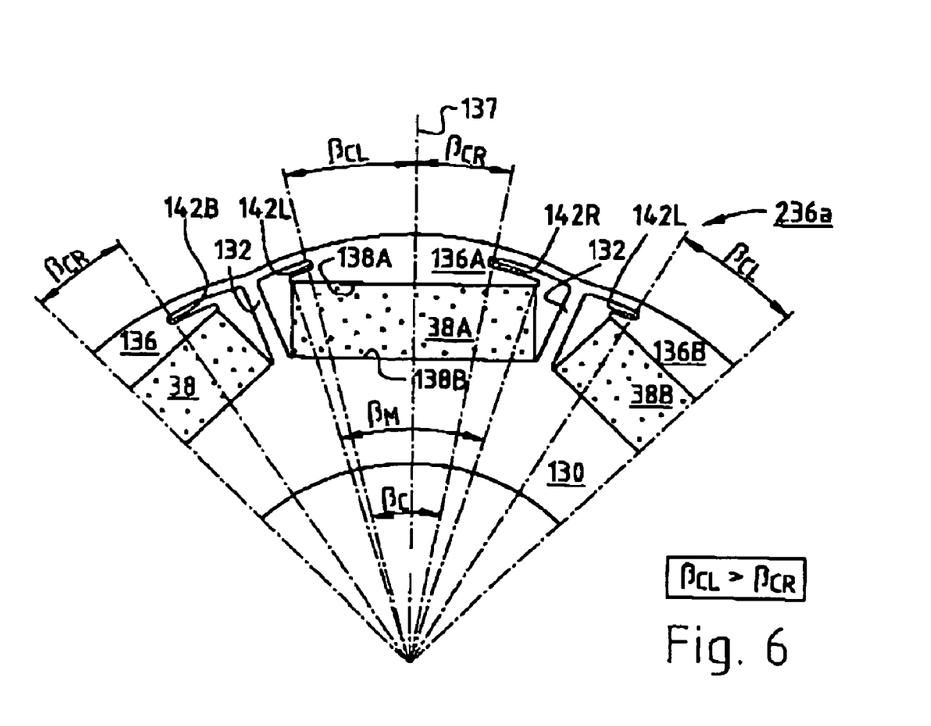
FIG. 6 is a view analogous to FIGS. 3 and 5, namely an illustration of a rotor lamination, in which the poles are formed slightly asymmetrically.

FIGS. 5 and 6 are views analogous to FIG. 3. The stator teeth 122A through 122D are not shown in FIGS. 5–6, but match those shown in FIG. 3.

FIG. 5 shows a sector of a rotor lamination 236, in which the magnets 38, 38A and 38B are shown. This rotor lamination has symmetrical poles 136, 136A, 136B since constrictions 142 are symmetrical with respect to a symmetry line 137, as also shown in FIGS. 2–4.

FIG. 6 shows, in a differing embodiment, a sector of a first variant of a rotor lamination 236a, in which the recesses 138A, 138B for the rotor magnets 38, 38A, 38B match the corresponding recesses of FIG. 5, but the constrictions 142L on the left side of a rotor pole (e.g. 136A) are, in FIG. 6, shorter than the constrictions 142R on the right side of this pole.

As a result, although the value of angle βc remains unchanged from the FIG. 5 embodiment, the angle βcl between symmetry line 137 and the left constriction 142L is greater than the angle βcr between symmetry line 137 and the right constriction 142R, so that the following relation exists:

$$\beta cl > \beta cr \quad (6).$$

Conversely, in a second version with laminations 236b, one could make βcr larger than βcl (not shown). This could be done by simply inverting the lamination 236a shown in FIG. 6, so that its underside is now face up.

If one makes a rotor lamination stack by, for example, first using a symmetrical lamination 236 according to FIG. 5, then placing an asymmetrical lamination 236a according to FIG. 6, then an asymmetrical lamination 236b (inverted lamination 236a), then again a lamination 236, then 236a, etc., one will obtain a better form of the voltage induced in the (unillustrated) stator winding and one obtains, by this simple expedient, a better smoothed torque.

Openings 138A, 138B for magnets 38 have all the same positions in all laminations 236, 236a, 236b, so that the symmetry lines 137 will match in all laminations.

Naturally, within the scope of the present invention, many changes and modifications are possible, so the invention is not limited to the specific embodiments shown and described. Rather, the invention is defined by the following claims.

What is claimed is:

1. An electric motor, comprising:
   a stator (28) having a lamination stack formed with slots (126), said slots having a predetermined slot pitch ($\tau_s$);
   a multi-phase stator winding (U, V, W) arranged in these slots (126);
   a rotor (36) separated by an air gap (39) from said stator (28), said rotor having, on its air-gap-adjacent side, a plurality of salient poles with pole shoes (136) facing said air gap (39) and on its air-gap-remote side, a magnetic core (130), connected mechanically by connecting parts (134a, 134b) to the poles shoes (136), said pole shoes serving for generation of at least one sinusoidal induced voltage in the stator winding (U, V, W);
   a recess (138, 140) provided between the magnetic core (130) and a pole shoe (136) and at least one permanent magnet (38), arranged in said recess, to generate a magnetic flux in said pole shoe (136) so that, at an interface between said permanent magnet to the associated pole shoe, a magnet/pole shoe boundary is defined, and adjacent said recess, on each side of said at least one permanent magnet (38), there extends a magnetically poorly conductive region (146a, 146b), said region being bounded, on its air-gap-adjacent side, by one of said connecting parts (134a, 134b);
   a circumferentially measured breadth (β) of each pole shoe (136) diminishing, at least partially, in a direction from the magnet/pole shoe boundary (138) toward said air gap (39) and, at a position of least breadth (142), having an angular extent ($\beta_c$) which has the following relationship to the slot pitch:

$$\beta_c = n^*(\tau_s)(1-0.02) \ldots n^*(\tau_s)(1-0.2)$$

wherein n=1, 2, 3 . . .
and the angles $\beta_c^*$ and $\tau_s$ are specified in mechanical degrees; and wherein a circumferentially extending magnet/pole shoe boundary (138A) is defined; and a first magnetic breadth ($\beta$M) of said pole shoe (136), at said magnet/pole shoe boundary, is greater than a second magnetic breadth ($\beta$C) of said pole shoe at a point (142), located radially farther than said boundary from the central axis of said rotor, at which the magnetic breadth of said pole shoe is smallest, and a transition from the first magnetic breadth to the second magnetic breadth is provided on both sides of said pole shoes, so that the magnetically poorly conductive regions, provided on both circumferential sides of the respective permanent magnets, further extend in a radial direction and are of similar shape.

2. The electric motor of claim 1, wherein the motor is arranged with an internal rotor.

3. The electric motor of claim 1, wherein a transition from a place (138) of greater breadth ($\beta$M) of a pole shoe (136) to a place (142) of smallest breadth ($\beta$C) is formed as a substantially continuous transition zone (139).

4. The electric motor of claim 3, wherein said continuous transition zone (139), together with adjacent connecting parts (134a, 134b), defines a cavity (146a, 146b) which widens with increasing circumferential distance from an associated rotor pole (136).

5. The electric motor of claim 4, wherein said at least one permanent magnet (38) creates lines of magnetic flux extending radially into an air gap (39); and said widening cavity (146a, 146b) serves as a magnetic resistance which increases with increasing circumferential distance from said rotor pole (136).

6. The electric motor of claim 1, wherein said pole shoes (136) are each substantially symmetrical about a radially extending axis (137) of symmetry.

7. The electric motor of claim 1, wherein said pole shoes are composed of metal laminations and, in at least a portion of said laminations, a place of lowest magnetic breadth ($\beta$C) is circumferentially displaced, relative to an axis (137) of symmetry of the pole shoe.

8. The electric motor according to claim 1, wherein each rotor magnet (38) is located in a recess formed between a respective pole shoe (136) and a central core (130), and said rotor magnet has, on its core-adjacent side, an angular extent ($\beta$MI) which is at least 85% of the pole interval ($\tau$P) separating adjacent ones of said salient poles.

9. The electric motor of claim 8, wherein said angular extent ($\beta$MI) is at least 95% of the pole interval ($\tau$P) separating adjacent ones of said salient poles.

10. The electric motor of claim 1, wherein said stator winding comprises a plurality of concentrated windings (128G, 128D).

\* \* \* \* \*